United States Patent [19]

Kaneda

[11] Patent Number: 4,989,173
[45] Date of Patent: Jan. 29, 1991

[54] FAST DIVIDER FOR A CONSTANT DIVISOR

[75] Inventor: Masayuki Kaneda, Tokyo, Japan

[73] Assignee: NEC Corporation, Tokyo, Japan

[21] Appl. No.: 466,148

[22] Filed: Jan. 19, 1990

[30] Foreign Application Priority Data

Jan. 19, 1989 [JP] Japan ................................. 1-10786

[51] Int. Cl.$^5$ .............................................. G06F 7/52
[52] U.S. Cl. .................................................. 364/764
[58] Field of Search .................... 364/761, 764, 715.01

[56] References Cited

U.S. PATENT DOCUMENTS 4,688,186 8/1987 Ferrell et al. ........................ 364/764

Primary Examiner—3
Assistant Examiner—Tan V. Mai
Attorney, Agent, or Firm—Foley & Lardner, Schwartz, Jeffery, Schwaab, Mack, Blumenthal & Evans

[57] ABSTRACT

In a divider for dividing a dividend by a divisor to calculate a quotient and a remainder, the divisor being a natural number which is a constant, each of the dividend, the quotient, and the remainder being an integer which is not less than zero, first through N-th comparing circuits compare the dividend with first through N-th predetermined constants. An n-th predetermined constant is equal to n times as large as the divisor, where n is variable between 1 and N, both inclusive. The first through the N-th comparing circuit produce first through N-th comparison result signals. A decoder decodes a combination of the first through the N-th comparison result signals into first and second partial decoded signals. The first partial decoded signal is equal to the quotient. The second partial decoded signal is equal to lower bits of a product of the quotient and the divisor. A subtracter subtracts the second partial decoded signal from lower bits of the dividend to produce the remainder.

2 Claims, 3 Drawing Sheets

| CR(1) | CR(2) CR(3) | --- | CR(63) | PD(1) | | | | | | PD(2) | | |
|---|---|---|---|---|---|---|---|---|---|---|---|---|
| 0 | 0 0 | --- | 0 | 0 | 0 | 0 | 0 | 0 | 0 | 0 | 0 | 0 |
| 1 | 0 0 | --- | 0 | 0 | 0 | 0 | 0 | 0 | 1 | 1 | 1 | 0 |
| 1 | 1 0 | --- | 0 | 0 | 0 | 0 | 0 | 1 | 0 | 1 | 0 | 0 |
| 1 | 1 1 | --- | 1 | 1 | 1 | 1 | 1 | 1 | 1 | 0 | 1 | 0 |

FAST DIVIDER FOR A CONSTANT DIVISOR

BACKGROUND OF THE INVENTION

This invention relates to a divider of dividing a dividend by a divisor to calculate a quotient and a remainder and, more particularly, to a divider for use in a case where the dividend is an integer which is not less than zero and the divisor is a natural number and a constant.

A divider divides a dividend by a divisor to calculate a quotient and a remainder. Insofar as this invention is cconcerned, the divisor is a natural number. Each of the dividend, the quotient, and the remainder is an integer which is not less than zero. The dividend is L bits long, where L represents a first predetermined natural number which is not less than two. The divisor is a constant which is M bits long, where M represents a second predetermined natural number which is not less than two.

A conventional divider comprises a memory for preliminarily memorizing a plurality of division results which are obtained by dividing a plurality of dividends by a divisor, respectively. Each of the division results consists of a quotient and a remainder. When the memory is accessed for a dividend, the memory produces one of the division results that corresponds to the dividend in question. In general, the memory has a long access time. Accordingly, the conventional divider comprising the memory is disadvantageous in that a long division time is consumed as compared with that comprising gates. When the conventional divider comprises another memory which has a short access time, the conventional divider is more expensive than the divider comprising gates.

SUMMARY OF THE INVENTION:

It is an object of this invention to provide a divider which is operable at a high speed.

It is another object of this invention to provide a divider of the type described, which has a low cost.

It is still another object of this invention to provide a divider of the type described, which comprises gates.

A divider to which this invention is applicable, is for dividing a dividend by a divisor to calculate a quotient and a remainder. The divisor is a natural number. Each of the dividend, the quotient, and the remainder is an integer which is not less than zero. The dividend is L bits long, where L represents a first predetermined natural number which is not less than two. The divisor is a constant which is M bits long, where M represents a second predetermined natural number which is not less than two. According to this invention, the divider comprises the following. (1) first through N-th comparing means supplied with the dividend in common and with first through N-th predetermined constants, respectively, for comparing the dividend with the first through the N-th predetermined constants. Here N represents a third predetermined natural number which is not less than two. The third predetermined natural number N being related to said first and second predetermined natural numbers L and M by $N = 2^{L-M} - 1$. Also an n-th predetermined constant is equal to n times the divisor, where n is a variable between 1 and N, both inclusive. The first through the N-th comparing means produces first through N-th comparison result signals indicative of first through N-th comparison results, respectively. (2) Decoding means connected to the first through the N-th comparing means for decoding a combination of the first through the N-th comparison result signals into a decoded signal which is divided into first and second partial decoded signals. The first partial decoded signal is equal to the quotient, the second partial decoded signal is equal to the lower M bits of a product of the quotient and the divisor, the lower M bits of the product being arranged from a least significant bit $2^0$ to an $(M-1)$-th bit $2^{M-1}$ as counted from the least significant bit $2^0$. (3) Operation means supplied with the dividend and connected to the decoding means for carrying out an operation on the second partial decoded signal and lower M bits of the dividend that are arranged from a least significant bit $2^0$ to an $(M-1)$-th bit $2^{M-1}$ as counted from the least significant bit $2^0$, the operation means thereby producing the remainder.

DESCRIPTION OF THE PREFERRED EMBODIMENT

Figure 1:
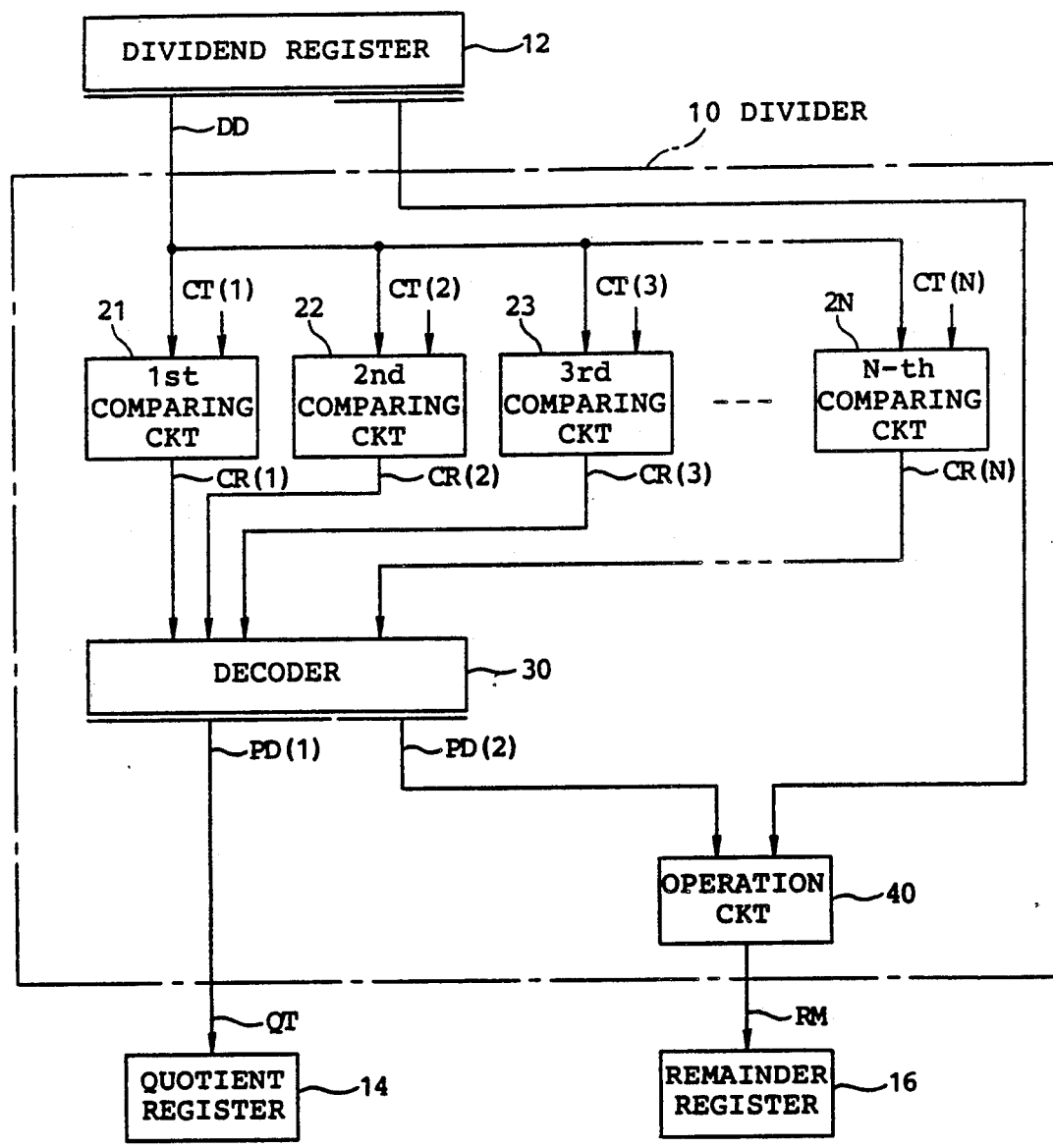
FIG. 1 is a block diagram of a divider according to an embodiment of the present invention and its peripheral units.

Referring to FIG. 1, a divider 10 according to a preferred embodiment of the present invention is for dividing a dividend DD by a divisor DS to calculate a quotient QT and a remainder RM. The Divisor DS is a natural number. Each of the dividend DD, the quotient QT, and the remainder RM is an integer which is not less than zero. The dividend DD consists of L bits arranged from a least significant bit $2^0$ to a most significant bit $2^{L-1}$, where L represents a first predetermined natural number which is not less than two. The divisor DS is a constant which consists of M bits arranged from a least significant bit $2^0$ to a most significant bit $2^{M-1}$, where M represents a second predetermined natural number which is not less than two.

The divider 10 is supplied with the dividend DD from a dividend register 12 and supplies the quotient QT and the remainder RM to a quotient register 14 and a remainder register 16, respectively.

The divider 10 comprises first through N-th comparing circuits 21, 22, 23, . . ., and 2N, where N represents a third predetermined natural number which is not less than two. The first through the N-th comparing circuits 21 to 2N are supplied with the dividend DD in common and with first through N-th predetermined constants CT(1), CT(2), CT(3), . . ., and CT(N), respectively. An n-th predetermined constant CT(n) is equal to n times as large as the divisor DS, where n is variable between 1 and N, both inclusive, The first through the n-th comparing circuits 21 to 2N compares the dividend DD with the first through the N-th predetermined constants CT(1) TO CT(N). The first through the N-th comparing circuits 21 to 2N produce first through N-th comparison result signals CR(1), CR(2), CR(3), . . ., and CR(N) which indicate the first through n-th comparison results, respectively. The first through the N-th comparison result signals CR(1) to CR(N) are supplied to a decoder 30.

The decoder 30 decodes a combination of the first through the N-th comparison result signals CR(1) to CR(N) into a decoded signal. The decoded signal is divided into first and second partial decoded signals PD(1) and PD(2). The first partial decoded signal PD(1) is equal to the quotient QT. The second partial decoded signal PD(2) is equal to the lower M bits of a product of the quotient QT and the divisor DS. The lower M bits of the product are arranged from a least significant bit $2^0$ to an (M−1)-th bit $2^{M-1}$ as counted from the least significant bit $2^0$. The second partial decoded signal PD(2) is supplied to an operation circuit 40.

The operation circuit 40 is supplied with the lower M bits of the dividend DD. The operation circuit 40 carries out an operation on the second partial decoded signal PD(2) and lower M bits of the dividend DD. The M bits of the dividend DD are arranged from the least significant bit $2^0$ to an (M−1)-th bit $2^{M-1}$ as counted from the least significant bit $2^0$. The operation circuit 40 thereby produces the remainder RM.

Figure 2:
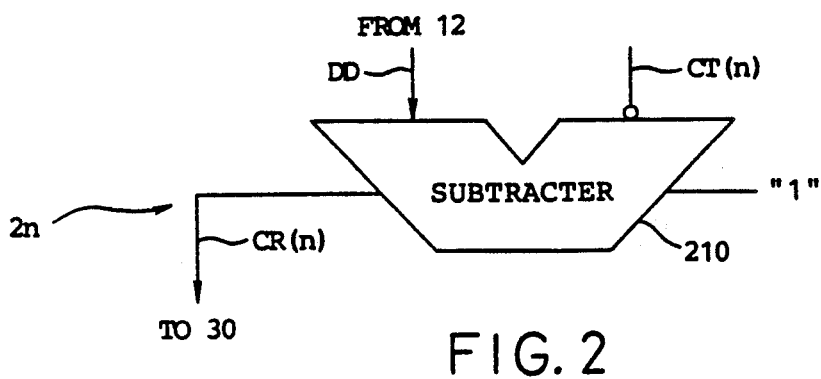
FIG. 2 is a block diagram of an n-th comparing circuit for use in the divider show in FIG. 1.

Turning to FIG. 2, an n-th comparing circuit 2n comprises a substractor 210. The substractor 210 substracts the n-th predetermined constant CT(n) from the dividend DD. When a borrow occurs in the substracter 210, namely, when a substraction result obtained by the substracter 210 is negative, the substracter 210 produces a logic "0" level as the n-th comparison result signal CR(n). Otherwise, the substractor 210 produces a logic "1" level as the n-th comparison result signal CR(n).

Figures 3, 4:
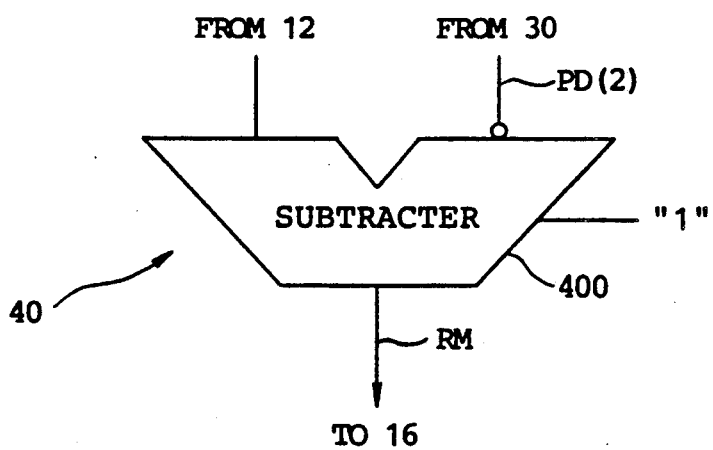
FIG. 3 shows a truth table of a decoder for use in the divider shown in FIG. 1.
FIG. 4 is a block diagram of an operation circuit for use in the divider shown in FIG. 1.

Consider, for example that the first predetermined natural number L is equal to nine. The second predetermined natural number M is equal to three. The divisor DS is the constant equal to six which is represented by a binary number 110. Under the circumstances the third predetermined natural number N is equal to sixty-three. The reason therefor will become clear when the description proceeds to a dividing circuit including the divider 10 that will later be illustrated wiht reference to FIG. 5. Each of the first through the sixty-third predetermined constants CT(1) to CT(63) may be represented by nine digits. For example, the first predetermined constant CT(1) is represented by a binary number 000 000 110. The second predetermined constant CT(2) is represented by a binary number 000 001 100. Similarly, the sixty-third predetermined constant CT(63) is represented by a binary number 101 111 010. p FIG. 3 shows a truth table of the decoder 30 described in conjuction with FIG. 1. The decoder 30 decodes the combination of the first through the sixty-third comparison results signals CR(1) to CR(63) into the first and the second partial decoded signals PD(1) and PD(2) which are represented by six digits and there digits respectively.

In the illustrated truth table, a first column (that is, the leftmost column) indicates a combination of the first through the sixty-third comparison result signals CR(1) to CR(63). Second and third columns, counted rightwards from the first column, indicate the first and the second partial decoded signals PD(1) and PD(2), respectively.

As shown in FIG. 3, a top line or a first row indicates a combination of the first through the sixty-third comparison result signals CR(1) to CR(63), and the first and the second partial decoded signals PD(1) to PD(2). For example, the decoder 30 produces the first partial decoded signal PD (1) represented by a binary number 000 010 and the second partial decoded signal PD(2) represented by a binary 100. This is shown in a fourth row (a third row on the numerals counted from the top line when each of the first and the second comparison result signals CR(1) and CR(2) takes the logic "1" level and when each of the third through the sixty-third comparison result signals CR(3)to CR(63) takes the logic "0" level. Similarly, the decoder 30 produces the first partial decoded signal PD(1) represented by a binary number 111 111 and the second partial decoded signal PD(2) represented by a binary number 010. This is shown in a bottom line when all of the first through the sixty-third comparison result signals CR(1) to CR(63) take the logic "1" levels.

Turning to FIG. 4, the operation circuit 40 is a substractor 400 supplied with the second partial decoded signal PD(2) of three bits long from the decoder 30 and with the lower three bits of the dividend DD. The subtracter 400 substracts the second partial decoded signal PD(2) from the lower three bits of the dividend DD to produce the remainder RM.

Figure 5:
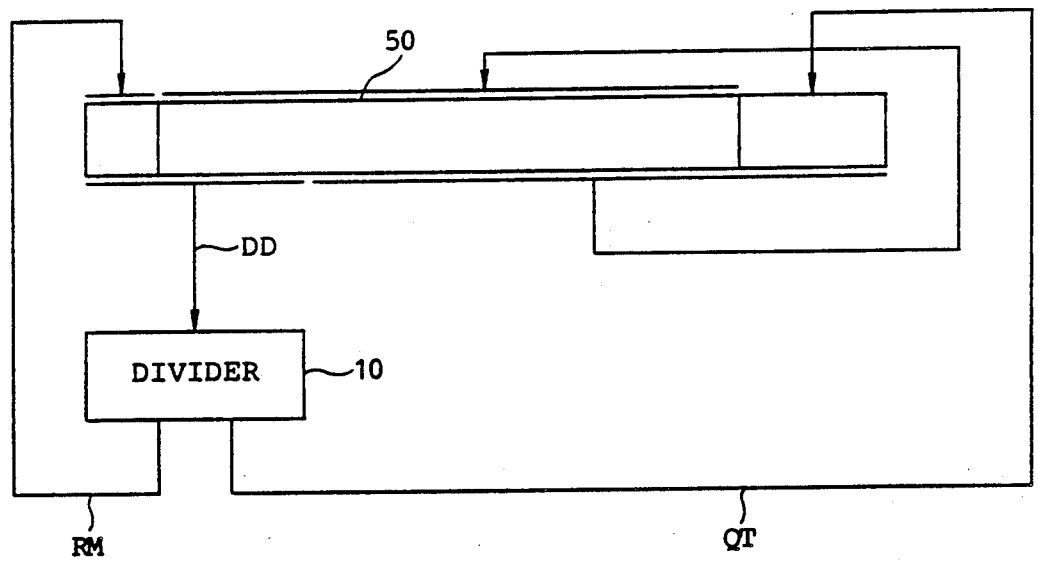
FIG. 5 is a block diagram of a dividing circuit including the divider shown in FIG. 1.
Figure 6:
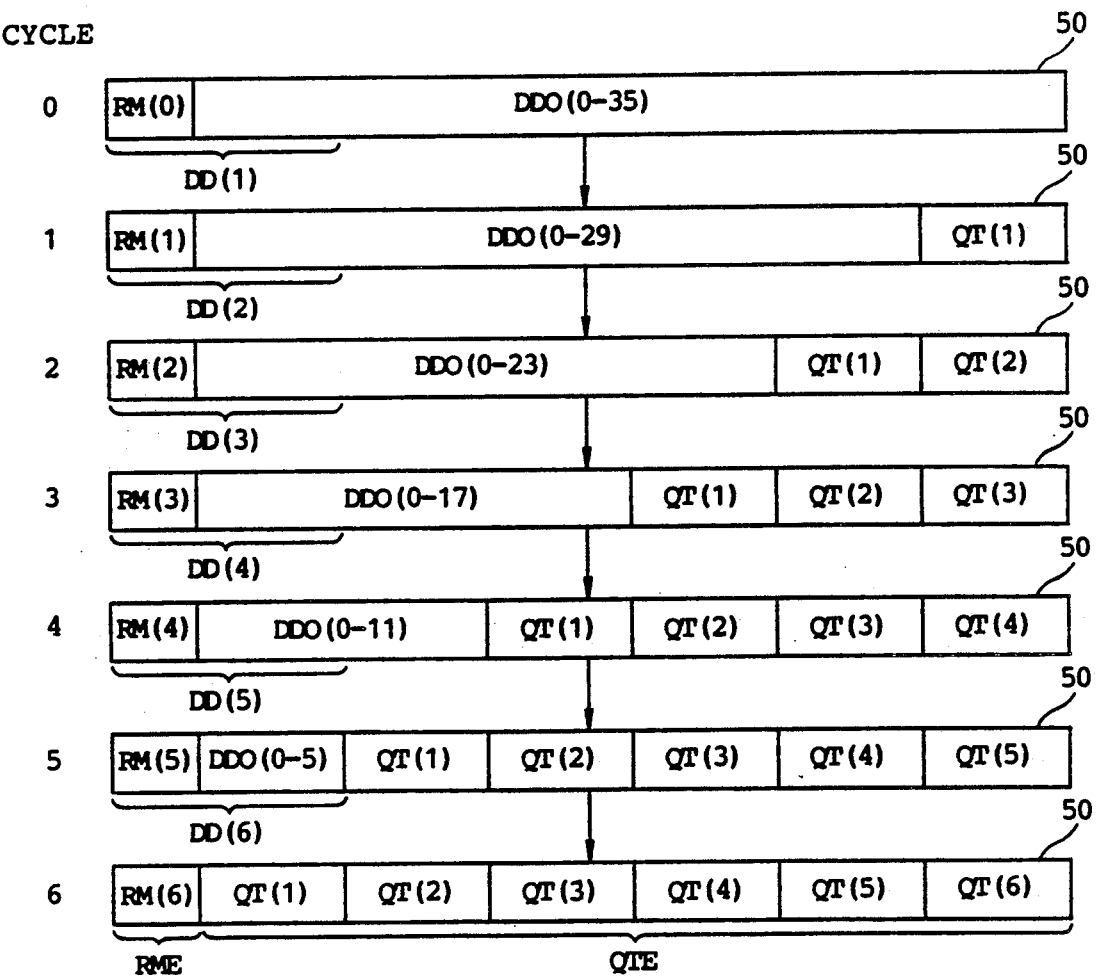
FIG. 6 is a diagram for use in describing a practical operation of the dividing circuit shown in FIG. 5.

Referring to FIGS. 5 and 6, the dividing circuit comprises the divider 10 and a register 50. The illustrated dividing circuit is for dividing an original dividend DDO by the divisor DS to calculate an eventual quotient QTE and an eventual remainder RME. The eventual quotient QTE is segmented into first through K-th partial quotients QT(1) to QT(K), where K represents a fourth predetermined natural number which is not less than two.

In the manner known in the art, the eventual quotient QTE and the eventual remainder RME are calculated by successively dividing first through K-th provisional dividends DD(1) to DD(K) (into which the original dividend DDO is divided) by the divisor DS.

In the example being illustrated, the fourth predetermined natural number K is equal to six. Accordingly, the eventual quotient QTE is partitioned into the first through the sixth partial quotients QT(1) to QT(6) and the original dividend DDO is segmented into the first through the sixth provisional dividends DD(1) to DD(6). In addition, the registister 50 holds a digital signal which consists of thirty-nine bits arranged from a least significant bit $2^0$ to a most significant bit $2^{38}$. The original dividend DDO, the eventual quotient OTE, each of the first through the sixth partial quotients QT(1) to QT(6), each of the first through the sixth provisional dividends DD(1) to DD(6), and the eventual remainder RME are represented by thirty-six digits, thirty-six digits, six digits, nine digits, and three digits, respectively.

The register 50 supplies the divider 10 with the upper nine bits of the digital signal as the dividend DD. The upper nine bits are arranged from the most significant bit $2^{38}$ to a thrity-first bit $2^{30}$ as counted from the least significant bit $2^0$. The dividend DD is one of the first through the sixth provisional dividends DD(1) to DD(6) at a time. The divider 10 supplies the register 50 with the quotient QT as the lower six bits of the digital signal that are arranged from the least significant bit $2^0$ to a sixth bit $2^5$ as counted from the least significant bit $2^0$. The quotient QT is one of the first through the sixth partial quotients QT(1) to QT(6) at a time. The divider 10 supplies the register 50 with the remainder RM as the upper three bits of the digital signal that are arranged from the most significant bit $2^{38}$ to a thirty-seventh bit $2^{36}$ as counted from the least significant bit $2^0$. The remainder RM is one of the first through sixth provisional remainders RM(1) to RM(6). The sixth provisional remainder RM(6) is equal to the eventual remainder RME. The register 50 is supplied with lower thirty bits of the digital signal that are arranged from the least significant bit $2^0$ to a thirteenth bit $2^{29}$ as counted from the least significant bit $2^0$, as the intermediate thirty bits of the digital signal that are arranged from a seventh bit $2^6$ to a thirty-sixth bit $2^{35}$ as counted from the least significant bit $2^0$.

Referring more particulary to FIG. 6, operation of the dividing circuit shown in FIG. 5 will be described. FIG. 6 shows state transitions of the register 50 in successive machine cycles. Zeroth through sixth machine cycles are indicated along a leftmost column in FIG. 6 by numerals 0 through 6.

In the zeroth or in an initial machine cycle, the register 50 holds the original dividend DDO and an initial provisional remainder RM(0) represented by a binary number 000. More particularly, set in the register 50 is the initial provisional remainder RM(0) as the thirty-seventh bit $2^{36}$ through the most significant bit $2^{38}$ of the digital signal. Set in the register 50 is the original dividend DDO as the least significant bit $2^0$ to the thirty-sixth bit $2^{35}$ of the digital signal. The thirty-first bit $2^{30}$ through the most significant bit $2^{38}$ of the digital signal are supplied to the divider 10 as the first provisional dividend DD(1). That is, the first provisional dividend DD(1) is a combination of the initial provisional remainder RM(0) and a thirty-first bit $2^{30}$ through the most significant bit $2^{35}$ of the original dividend DDO. Supplied with the first provisional dividend DD(1), the divider 10 divides the first provisional dividend DD(1) by the divisor DS to calculate the first partial quotient QT(1) and the first provisional remainder RM(1).

In the first machine cycle, the first partial quotient QT(1) and the first provisional remainder RM(1) are set in the register 50 as the lower six bits and the upper three bits of the digital signal, respectively. Simultaneously, the lower thirty bits of the digital signal are shifted leftwardly of FIG. 5 six bits in the register 50 as the intermediate thirty bits of the digital signal. That is, the upper three bits, the intermediate thirty bits, and the lower six bits of the digital signal are equal to the first provisional remainder RM(1), the least significant bit $2^0$ to a thirtieth bit $2^{29}$ of the original dividend DDO depicted at DDO(0-29), and the first partial quotient QT(1), respectively. The thirty-first bit $2^{30}$ through the most significant bit $2^{38}$ of the digital signal are supplied to the divider 10 as the second provisional dividend DD(2). That is, the second provisional dividend DD(1) is a combination of the first provisional remainder RM(1) and a twenty-fifth bit $2^{24}$ to the thirtieth bit $2^{29}$ of the original dividend DDO. Supplied with the second provisional dividend DD(2), the divider 10 divides the second provisional dividend DD(2) by the divisor DS to calculate the second partial quotient QT(2) and the second provisional remainder RM(2).

In the second machine cycle, the second partial quotient QT(2) and the second provisional remainder RM(2) are set in the register 50 as the lower six bits and the upper three bits of the digital signal, respectively. Simultaneously, the lower thirty bits of the digital signal are shifted leftwardly of FIG. 5 six bits in the register 50 as the intermediate thirty bits of the digital signal. That is, the register 50 holds the second provisional remainder RM(2), a combination of the least significant bit $2^0$ through a twenty-fourth bit $2^{23}$ of the original dividend DDO depicted at DDO(0-23) and the first partial quotient QT(1), and the second partial quotient QT(2) as the upper three bits, the intermediate thirty bits, and the lower six bits of the digital signal, respectively. The thirty-first bit $2^{30}$ through the most significant bit $2^{38}$ of the digital signal are supplied to the divider 10 as the third provisional dividend DD(3). That is, the third provisional dividend DD(3) is a combination of the second provisional remainder RM(2) and a nineteenth bit $2^{18}$ through the twenty-fourth bit $2^{23}$ of the original dividend DDO. Supplied with the third provisional dividend DD(3), the divider 10 divides the third provisional dividend DD(3) by the divisor DS to calculate the third quotient QT(3) and the third provisional remainder RM(3).

In the third machine cycle, the third partial quotient QT(3) and the third provisional remainder RM(3) are set in the register 50 as the lower six bits and the upper three bits of the digital signal, respectively. Simultaneously, the lower thirty bits of the digital signal are shifted leftwards in FIG. 5 six bits in the register 50 as the intermediate thirty bits of the digital signal. That is, the register 50 holds the third provisional remainder RM(3), the third partial quotient QT(3), and a combination of the least significant bit $2^0$ through an eighteenth bit $2^{17}$ of the original dividend DDO depicted at DDO(0-17), the first partial quotient QT(1), and the second partial quotient QT(2) as the upper three bits, the lower six bits, and the intermediate thirty bits of the digital signal, respectively. The thirty-first bit $2^{30}$ through the most significant bit $2^{38}$ of the digital signal are supplied to the divider 10 as the fourth provisional dividend DD(4). That is, the fourth provisional dividend DD(4) is a combination of the third provisional remainder RM(3) and a thirteenth bit $2^{12}$ through the eighteenth bit $2^{17}$ of the original dividend DDO. Supplied with the fourth provisional dividend DD(4), the divider 10 divides the fourth provisional dividend DD(4) by the divisor DS to calculate the fourth partial quotient QT(4) and the fourth provisional remainder RM(4).

In the fourth machine cycle, the fourth partial quotient QT(4) and the fourth provisional remainder RM(4) are set in the register 50 as the lower six bits and the upper three bits of the digital signal, respectively. Simultaneously, as shown in FIG. 3, the lower thirty bits of the digital signal are shifted leftwards six bits in the register 50 as the intermediate thirty bits of the digital signal. That is, the register 50 holds the fourth provisional remainder RM(4), the fourth partial quotient QT(4), and a combination of the least significant bit $2^0$ through a twelfth bit $2^{11}$ of the original dividend DDO depicted at DDO(0-11), the first partial quotient QT(1), the second partial quotient QT(2), and the third partial quotient QT(3) as the upper three bits, the lower six bits, and the intermediate thirty bits of the digital signal, respectively. The thirty-first bit $2^{30}$ through the most significant bit $2^{38}$ of the digital signal are supplied to the divider 10 as the fifth provisional dividend DD(5). That is, the fifth provisional dividend DD(5) is a combination of the fourth provisional remainder RM(4) and a seventh bit $2^6$ to the twelfth bit $2^{11}$ of the original dividend DDO. Supplied with the fifth provisional dividend DD(5), the divider 10 divides the fifth provisional dividend DD(5) by the divisor DS to calculate the fifth partial quotient QT(5) and the fifth provisional remainder RM(5).

In the fifth machine cycle, the fifth partial quotient QT(5) and the fifth provisional remainder RM(5) are set in the register 50 as the lower six bits and the upper three bits of the digital signal, respectively. Simultaneously, the lower thirty bits of the digital signal are shifted leftwards in FIG. 5 six bits in the register 50 as the intermediate thirty bits of the digital signal. That is, the register 50 holds the fifth provisional remainder RM(5), the fifth partial quotient QT(5), and a combination of the least significant bit $2^0$ to a sixth bit $2^5$ of the original dividend DDO depicted at DDO(0-5), the first partial quotient QT(1), the second partial quotient QT(2), the third partial quotient QT(3), and the fourth partial quotient QT(4) as the upper three bits, the lower six bits, and the intermediate thirty bits of the digital signal, respectively. The thirty-first bit $2^{30}$ through the most significant bit $2^{38}$ of the digital signal are supplied to the divider 10 as the sixth provisional dividend DD(6). That is, the sixth provisional dividend DD(6) is a combination of the fifth provisional remainder RM(5) and the least significant bit $2^0$ through the sixth bit $2^5$ of the original dividend DDO. Supplied with the sixth provisional dividend DD(6), the divider 10 divides the sixth provisional dividend DD(6) by the divisor DS to calculate the sixth provisional remainder RM(6).

In the sixth machine cycle, the sixth partial quotient QT(6) and the sixth provisional remainder RM(6) are set in the register 50 as the lower six bits and the upper three bits of the digital signal, respectively. Simultaneously, the lower thirty bits of the digital signal are shifted leftwards in FIG. 5 six bits in the register 50 as the intermediate thirty bits of the digital signal. That is, the register 50 holds the sixth provisional remainder RM(6), the sixth partial quotient QT(6), and a combination of the first partial quotient QT(1), the second partial quotient QT(2), the third partial quotient QT(3), the fourth partial quotient QT(4), and the fifth partial quotient QT(5) as the upper three bits, the lower six bits, and the intermediate thirty bits of the digital signal, respectively. At the sixth machine cycle, division processing of the dividing circuit comes to an end and the register 50 produces the sixth provisional remainder RM(6) and a combination of the first partial quotient QT(1), the second partial quotient QT(2), the third partial quotient QT(3), the fourth partial quotient QT(4), the fifth partial quotient QT(5), and the sixth partial quotient QT(6) as the eventual remainder RME and the eventual quotient QTE, respectively.

As mentioned before, each of the first through the sixth provisional remainders RM(1) to RM(6) is equal to a selected one between zero represented by a binary number 000 and five represented by a binary number 101. Accordingly, each of the first through the sixth provisional remainders RM(1) to RM(6) may be equal to a particular one between zero represented by a binary number 000 000 000 and three hundred and eighty-three represented by a binary number 101 111 111. As a result, each of the first through the sixth partial quotients QT(1) to QT(6) does not exceed sixty-three represented by a binary number 111 111. It is therefore understood that the third predetermined natural number N is equal to sixty three, and that N is related to the first and second predetermined natural numbers L and M, respectively by $N = 2^{LM} - 1$.

Finally, suppose that the divisor DS is another constant. In this event, the n-th predetermined constant CT(n) is changed in accordance with the divisor DS. This is because the n-th predetermined constant CT(n) is equal to n times the divisor DS. In addition, the decoder 30 is modified so that the second partial decoded signal PD(2) is equal to lower M bits of a product of the quotient QT and the divisor DS.

What is claimed is:

1. A divider for dividing a dividend by a divisor to calculate a quotient and a remainder, said divisor being a natural number, each of said dividend, said quotient, and said remainder being an integer which is not less than zero, said dividend being L bits long, where L represents a first predetermined natural number which is not less than two, said divisor being a constant which is M bits long, where M represents a second predetermined natural number which is not less than two, comprising:

first through N-th comparing means supplied with said dividend in common and with first through N-th predetermined constants, respectively, for comparing said dividend with said first through said N-th predetermined constants, where N represents a third predetermined natural number which is not less than two, said third predetermined natural number N being related to said first and said second predetermined natural numbers L and M, respectively, by $N = 2^{LM} - 1$, an n-th predetermined constant being equal to n times said divisor, where n is variable between 1 and N, both inclusive, said first through said N-th comparing means producing first through N-th comparison result signals indicative of first through N-th comparison results, respectively;

decoding means connected to said first through said N-th comparing means for decoding a combination of said first through said N-th comparison result signals into a decoded signal which is divided into first and second partial decoded signals, said first partial decoded signal being equal to said quotient, said second partial decoded signal being equal to lower M bits of a product of said quotient and said divisor, the lower M bits of said product being arranged from a least significant bit $2^0$ to an M-th bit $2^{M-1}$ as counted from said least significant bit $2^0$; and operation means supplied with said dividend and connected to said decoding means for carrying out an operation on said second partial decoded signal and lower M bits of said dividend that are arranged from a least significant bit $2^0$ to an M-th bit $2^{M-1}$ as counted from said least significant bit $2^0$, said operation means thereby producing said remainder.

2. A divider as claimed in claim 1, wherein said operation means is a subtracter for subtracting said second partial decoded signal from the lower M bits of said dividend to produce said remainder.

* * * * *